United States Patent
Kobayashi et al.

(10) Patent No.: US 6,895,003 B1
(45) Date of Patent: May 17, 2005

(54) COMMUNICATION SYSTEM, APPARATUS, AND METHOD IN WHICH DATA TRANSMISSION IS INTERRUPTED FOR A BUS RESET

(75) Inventors: Takashi Kobayashi, Yokohama (JP); Shinichi Hatae, Kawasaki (JP); Mitsuo Niida, Yokohama (JP); Shinji Ohnishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 09/252,926

(22) Filed: Feb. 19, 1999

(30) Foreign Application Priority Data

| Feb. 24, 1998 | (JP) | 10-042656 |
| Mar. 12, 1998 | (JP) | 10-061708 |
| Mar. 30, 1998 | (JP) | 10-084709 |

(51) Int. Cl.[7] .............................................. H04B 1/56
(52) U.S. Cl. ........................ 370/389; 370/475; 710/104; 710/260
(58) Field of Search ................................. 370/475, 276, 370/242, 248, 351, 359, 402, 419, 438, 458, 489, 498; 710/100, 102–4, 260–6

(56) References Cited

U.S. PATENT DOCUMENTS

| 5,838,950 | A | * | 11/1998 | Young et al. ................. 703/21 |
| 5,938,752 | A | * | 8/1999 | Leung et al. ................ 710/106 |
| 6,237,106 | B1 | | 5/2001 | Koyama et al. ............. 713/502 |
| 6,272,114 | B1 | | 8/2001 | Kobayashi ................... 370/257 |
| 6,389,029 | B1 | * | 5/2002 | McAlear ...................... 370/402 |
| 6,405,247 | B1 | * | 6/2002 | Lawande et al. ............ 709/220 |
| 6,446,142 | B1 | * | 9/2002 | Shima et al. ................. 710/16 |
| 6,473,521 | B1 | | 10/2002 | Hino .......................... 382/164 |

FOREIGN PATENT DOCUMENTS

JP  4-243451  8/1992

* cited by examiner

Primary Examiner—David Vincent
(74) Attorney, Agent, or Firm—Fitzpatrick, Cella, Harper & Scinto

(57) ABSTRACT

A communication system, in which data transmission is interrupted for a bus reset, includes a source and a destination with a receiving buffer. The source is adapted to transmit a segment of data to the destination using address information corresponding to a part of the receiving buffer of the destination. Transmission of the data is interrupted if a process of resetting a bus between the source and the destination occurs. After the process of resetting the bus ends, the transmission of the data resumes without retransmitting data determined by the source to be already stored in the receiving buffer.

16 Claims, 11 Drawing Sheets

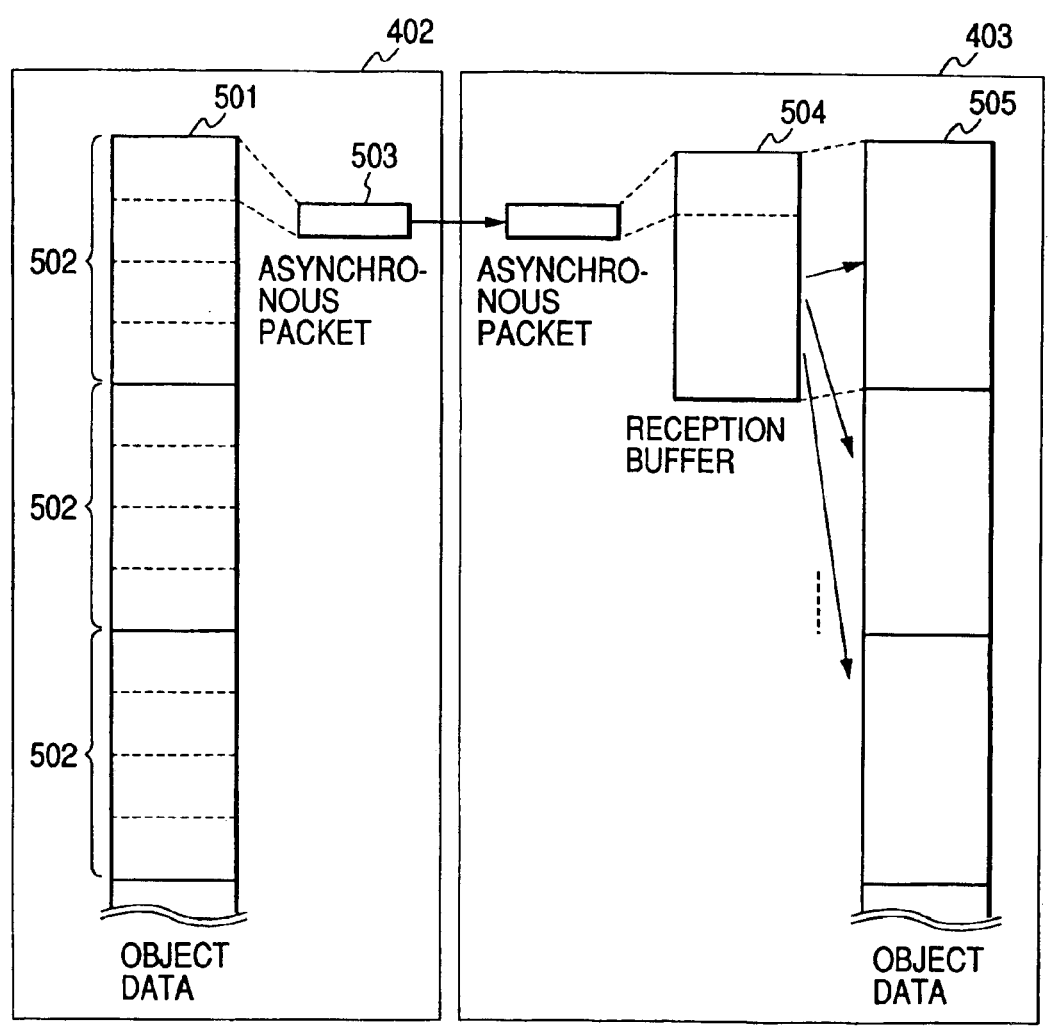

COMMUNICATION SYSTEM, APPARATUS, AND METHOD IN WHICH DATA TRANSMISSION IS INTERRUPTED FOR A BUS RESET

BACKGROUND OF THE INVENTION

1. Field of the Invention

This invention relates to a data communication system, data communication method and data communication apparatus, and relates in particular to communication between a source and a destination, in which the source transmits is one segment of data to the destination using address information corresponding to a part of a receiving buffer of the destination.

2. Related Background Art

Conventionally, among peripheral devices for personal computers (hereafter referred to as PCs), hard disks and printers have had the highest frequency of use. These peripheral devices were connected to the PC by means of a general-purpose digital interface such as a dedicated input/output interface or a SCSI interface (small computer system interface).

Recently, however, AV (Audio/Visual) devices such as digital cameras and digital video cameras are commanding greater interest and attention as PC peripheral devices. These AV (Audio/Visual) devices have also been connected to the PC via a dedicated interface.

With conventional dedicated interfaces and SCSI interfaces, particularly when large volumes of data are involved, such as the still images and moving images conveyed by AV devices, the rate of data transmission has been low, and because parallel communication is used, large communication cables were required, limiting the number and types of peripheral devices that could be connected to only a few devices. Numerous problems arose, such as limitations in the connection method and the inability to transmit data in real time.

The IEEE (Institute of Electrical and Electronics Engineers, Inc.) 1394-1995 standards are known as a next-generation digital interface featuring high speed and a high level of performance, and are designed to solve these problems.

Digital interfaces that conform to the IEEE 1394-1995 standards (hereafter referred to as 1394 interfaces) offer the following features.
(1) Data is transmitted at high speed.
(2) Two methods for transmitting data in real time are supported: the isochronous transmission method and the asynchronous transmission method.
(3) Connections can be configured (topology) with a high degree of freedom.
(4) Plug-and-play functions and hot-line insertion/removal functions are supported.

With IEEE 1394-1995 standards, however, certain elements such as the physical and electrical configurations of connectors and the two most fundamental data transmission methods are defined, but other elements such as the types of data, the data configuration, and the communication protocol by which data is sent and received, are not defined.

Furthermore, with the isochronous transmission method used with the IEEE 1394-1995 standards, because the response to transmitted packets is not regulated, there is no assurance as to whether each individual isochronous packet has been received. Consequently, the isochronous transmission method cannot be used to assure successful transmission of consecutive multiple data items, or of data from a single file which has been subdivided into multiple data items.

Moreover, with the isochronous transmission method used with the IEEE 1394-1995 standards, the total number of communications is restricted to 64, even if there are available transmission band widths. For this reason, it is not possible to use the isochronous transmission method to transmit numerous communications on a small number of transmission band widths.

In addition, with the IEEE 1394-1995 standards, in cases such as the bus being reset when the power supply to a node is turned on or off, or when a node is connected or disconnected, it is necessary to interrupt the transmission of data. With the IEEE 1394-1995 standards, conversely, if data transmission is interrupted by a bus reset or an error occurring during the transmission, it is not possible to discern the contents of the data which have been lost. Furthermore, resumption of a transmission which was interrupted requires extremely complex and intricate communication procedures.

The bus reset is a function by which new topologies are recognized and the addresses assigned to the various nodes (node IDs) are set automatically. This function enables plug-and-play functions and hotline insertion/removal functions to be supported with the IEEE 1394-1995 standards.

Additionally, with regard to communication systems conforming to the IEEE 1394-1995 standards, although real-time transmission is not required, there have been no specific proposals for a communication protocol which would enable continuous transmission of object data comprising comparatively large volumes of data (for instance, still image data, graphics data, text data, file data, and program data) where a high level of reliability is required.

SUMMARY OF THE INVENTION

An object of the present invention is to solve the above-described problems.

Another object of the invention is to provide technology which enables, in a data communication system, data communication method, and data communication apparatus, continuous and successful transmission of object data where real-time transmission is not a necessity.

Another object of the invention is to enable the rapid resumption of data transmission, in a data communication system, data communication method, and data communication apparatus, when data transmission has been interrupted, and to provide technology that reduces the volume of data being transmitted in a redundant manner.

According to an embodiment of the present invention, a communication system is provided, which includes a source and a destination with a receiving buffer. The source is adapted to transmit a segment of data to the destination using address information corresponding to a part of the receiving buffer of the destination. The source interrupts transmission of the data if a process of resetting a bus between the source and the destination occurs. After the process of resetting the bus ends, the source resumes transmission of the data without retransmitting data determined by the source to be already stored in the receiving buffer.

According to another embodiment of the present invention, a communication method is provided for a communication apparatus that transmits a segment of data to a destination using address information corresponding to a part of a receiving buffer of the destination. According to the method, transmission of the data is interrupted if a process of resetting a bus between the apparatus and the destination occurs. After the process of resetting the bus ends, transmission of the data resumes without retransmitting data determined by the apparatus to be already stored in the receiving buffer.

According to yet another embodiment of the present invention, a communication apparatus is provided, which transmits a segment of data to a destination using address information corresponding to a part of a receiving buffer of the destination. The apparatus includes interrupting means for interrupting transmission of the data if a process of resetting a bus between the apparatus and the destination occurs, and resuming means for resuming, after the process of resetting the bus ends, transmission of the data without retransmitting data determined by the apparatus to be already stored in the receiving buffer.

According to still another embodiment of the present invention, a communication apparatus is provided, which transmits a segment of data to a destination using address information corresponding to a part of a receiving buffer of the destination. The apparatus includes a digital interface connected to a bus between the apparatus and the destination, and a controller adapted to control communication between the apparatus and the destination. The controller interrupts transmission of the data if a process of resetting a bus between the apparatus and the destination occurs. After the process of resetting the bus ends, the controller causes transmission of the data to resume without retransmitting data determined by the apparatus to be already stored in the receiving buffer.

BRIEF DESCRIPTION OF THE DRAWINGS

FIG. 5 is a drawing describing a transmission model for object data.

DESCRIPTION OF THE PREFERRED EMBODIMENTS

The preferred embodiments of the present invention will now be described in detail hereinafter with reference to the accompanying drawings.

Figure 1:
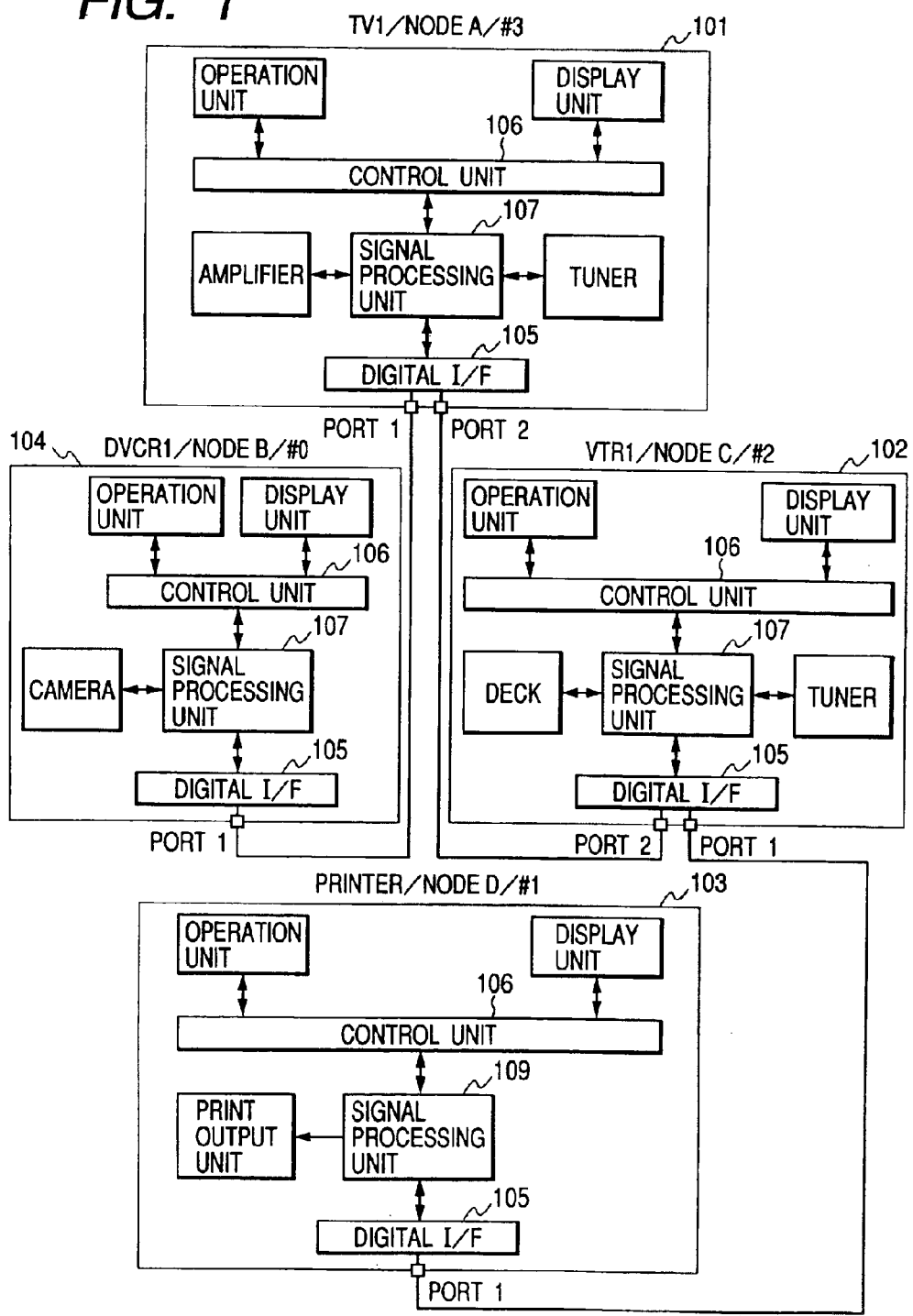
FIG. 1 is a block diagram indicating a configuration example of the communication system of this embodiment.

FIG. 1 is a block diagram describing the configuration of the communication system of this embodiment. In FIG. 1, each of devices provides a digital interface 105 conforming to the IEEE 1394-1995 standards (hereafter referred to as 1394 standards).

The communication system indicated in FIG. 1 is configured of a TV 101, a digital video tape recorder (hereafter referred to as DVTR) 102, a printer 103, and a digital camcorder (hereafter referred to as DVCR) 104.

In FIG. 1, the TV 101, DVTR 102, and DVCR 104 provide a control unit 106 and a signal processing unit 107, while the printer 103 provides a control unit 106 and an image processing unit 109. These devices are connected by means of communication cables which conform to 1394 standards.

In this embodiment, there are two types of communication cables, a 4-pin cable and a 6-pin cable. The 4-pin cable is configured of two pairs of twisted-pair shielded wires, and is used for data transmission and communication of intervention signals. The 6-pin cable is configured of two pairs of twisted-pair cables and a pair of power supply cables. Data transmitted using the two pairs of twisted-pair cables is data that has been coded using the DS-Link method.

Next, the configuration of the digital interface 105 used in this embodiment will be described in detail with reference to FIG. 2.

The digital interface 105 is functionally configured of multiple layers. In FIG. 2, the digital interface 105 is connected to the digital interfaces 105 of other devices by means of a communication cable 201 that conforms to the IEEE 1394-1995 standards. Furthermore, the digital interface 105 has at least one communication port 202, with each communication port 202 being connected to a physical layer 203 which is included in a hardware unit.

Figure 2:
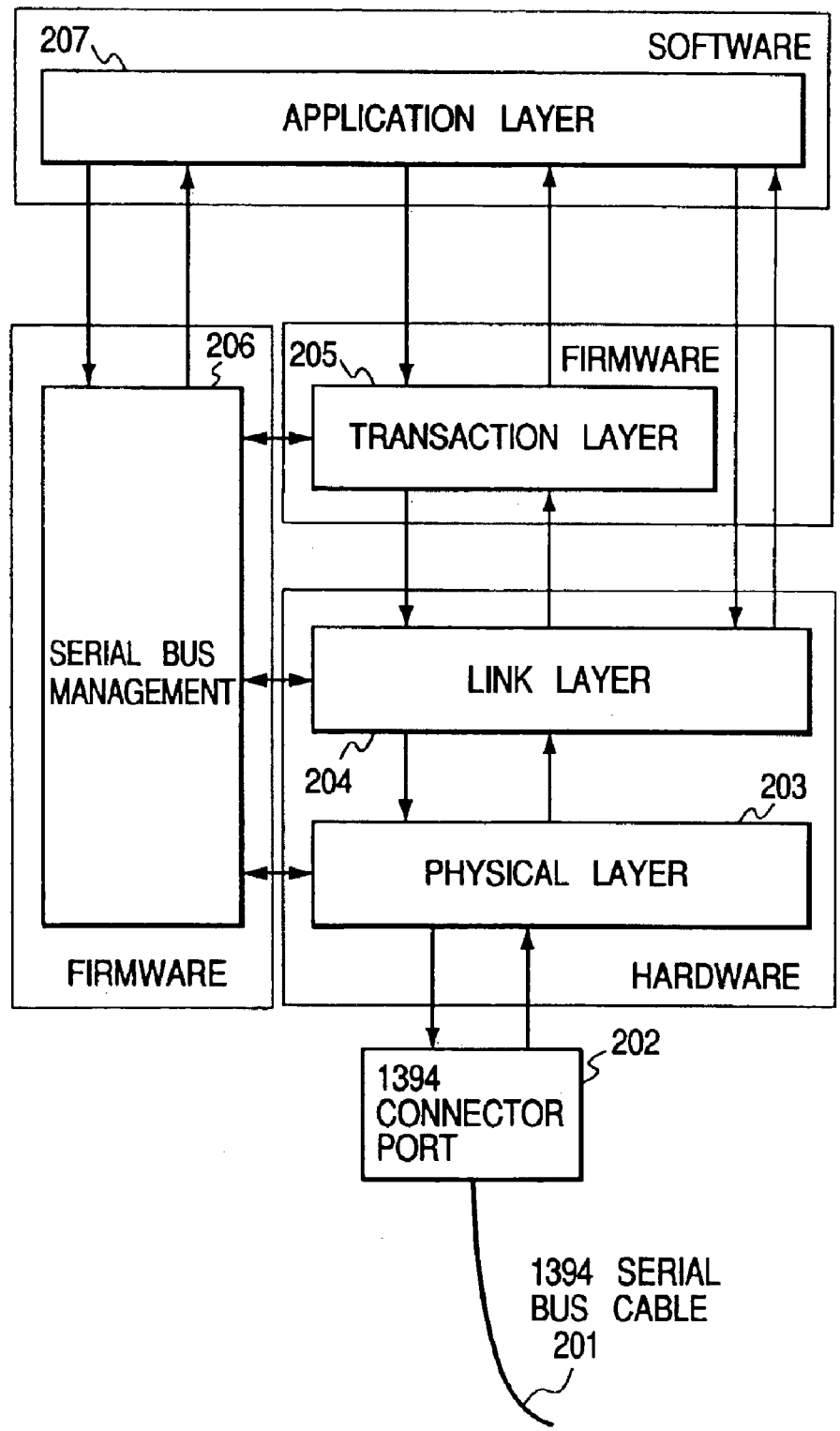
FIG. 2 is a drawing describing the configuration of the 1394 interface of this embodiment.

In FIG. 2, the hardware unit is configured of a physical layer 203 and a link layer 204. The physical layer 203 handles detection of physical and electrical interfaces with other nodes, bus resets and the accompanying processing, coding and decoding of input and output signals, intervention in bus usage rights, and other functions. The link layer 204 formulates communication packets, sends and receives the various types of communication packets, and handles control of cycle timers, as well as other functions. The link layer 204 also formulates the packets stipulated by the communication protocol described at a later point, and provides transmission functions.

Also, in FIG. 2, the firmware unit includes a transaction layer 205 and a serial bus management 206. The transaction layer 205 oversees the asynchronous transmission method, and provides various types of transactions (reading, writing, locking). The transaction layer 205 also provides a function by which the transactions governed by the communication protocol described at a later point are managed. The serial bus management 206 provides functions, based on the IEEE 1212 CSR standards, by which its own nodes are controlled, the connection statuses of its own nodes are managed, ID information for its own nodes is managed, and resource management of the serial bus network is carried out. The serial bus management 206 also provides a function by which control of the various types of processing operations relating to the communication protocol described at a later point is carried out.

The hardware unit and firmware unit illustrated in FIG. 2 make up, in practical terms, the 1394 interface, and the basic configuration of these units is governed by the IEEE 1394-1995 standards.

Additionally, the application layer 207 included in the software unit varies depending on the application software being used, and controls the types of object data that can be transmitted, and the manner in which they are transmitted.

The communication protocol of this embodiment, described at a later point, expands the functions of the hardware unit and firmware unit making up the digital interface 105, and provides new transmission procedures for the software unit.

With the digital interface 105 described above, when the power supply is turned on, the bus is reset automatically in response to changes in the connection configuration, such as the connection of new devices and the disconnection of devices.

A bus reset refers to processing in which the connection configuration of the various devices comprising the communication system (hereafter referred to as nodes) recognized up to the current point in time, and the communication addresses of those devices (hereafter referred to as node IDs) are initialized, the new connection configuration is recognized once again, and communication addresses are specified once again.

The next section is a brief description of the processing procedures involved in a bus reset. These procedures include recognition of the tiered connection configuration of the communication system and assignment of physical communication addresses for each of the nodes.

Recognition of the connection configuration is implemented after the bus reset has begun, by a declaration of the hierarchical relationship between the various nodes. The various nodes are recognized as a communication system with a tree-type construction (tiered construction) by the nodes determining the hierarchical relationship between each of the nodes. Because the hierarchical relationship between each of the nodes depends on the connection status of the communication system and on the functions of the various nodes, the same relationship does not necessarily result each time a bus reset is carried out.

For instance, in the communication system illustrated by FIG. 1, first, the various digital interfaces 105 determine the hierarchical relationship between the printer 103 (hereafter referred to as Node D) and the DVTR 102 (hereafter referred to as Node C). Next, the hierarchical relationships between the DVCR 104 (hereafter referred to as Node B) and the TV 101 (hereafter referred to as Node A), and between Node C and Node A, are specified.

Finally, all of the devices recognized as having nodes with a higher hierarchical (or upper-level) position serve as root nodes, and management of intervention in the bus usage rights of this communication system is carried out. In the communication system illustrated in FIG. 1, Node A is the root node.

After the root nodes have been determined, specification of node IDs for the various nodes configuring the communication system begins automatically. Basically, node IDs are specified by the node with the higher hierarchical position allowing a physical address to be specified for a node with a lower hierarchical position which is connected to a communication port with a lower port number, following which the lower-position node grants permission for its own subsidiary nodes to specify addresses, and the processing continues in sequential order. Nodes for which their own node IDs have already been specified transmit their own ID packets, and notify other nodes of the node IDs assigned to them. Ultimately, after node IDs have been specified for all of the lower-position nodes, the higher-position nodes specify their own node IDs.

In the processing described above, as processing is carried out repeatedly, the node IDs for the root nodes are the last to be specified. Because the node IDs assigned to the various nodes depend on the hierarchical relationship between the various devices, the same node ID will not necessarily be specified for the same node each time a bus reset occurs.

Next, the process by which node IDs are automatically specified will be described in reference to FIG. 1. The following description will apply to a case in which, after the connection configuration has been recognized, Node A serves as the root node.

In FIG. 1, Node A, which is the root node, first allows a node ID to be specified for the node connected to the "Port 1" communication port, namely, Node B.

Node B specifies its own node ID as "#0", and broadcasts the resulting address to all of the nodes configuring the communication system, as a self-ID packet. Here, "broadcast" refers to specific information being sent to the addresses of numerous unspecified nodes.

As a result, all of the nodes acknowledge that the node ID "#0" has already been assigned, and the next node for which address specification is permitted specifies the next node address as "#1". After Node B has been specified, Node A allows specification of a node ID for the node connected to the "Port 2" communication port, namely Node C.

Node C grants permission for IDs to be specified for the communication ports connected to the lower-position nodes, in sequential order, starting with the lowest port number. In other words, permission is granted for Node D, and after a node ID of "#1" is specified for Node D, and Node D, having accepted that permission, then broadcasts a self-ID packet.

After Node D has been specified, Node C specifies its own node ID as "#3", and finally, Node A, which is the root node, specifies its own node ID as "#4", and recognition of the connection configuration is concluded.

Through this type of bus reset processing, the digital interfaces 105 are able to automatically recognize the connection configuration of the communication system and specify the communication addresses for the various nodes. The various nodes, using the node IDs described above, are then able to carry out communications among themselves.

Next, the data transmission method provided by the digital interfaces 105 will be described in reference to FIG. 3.

Figure 3:
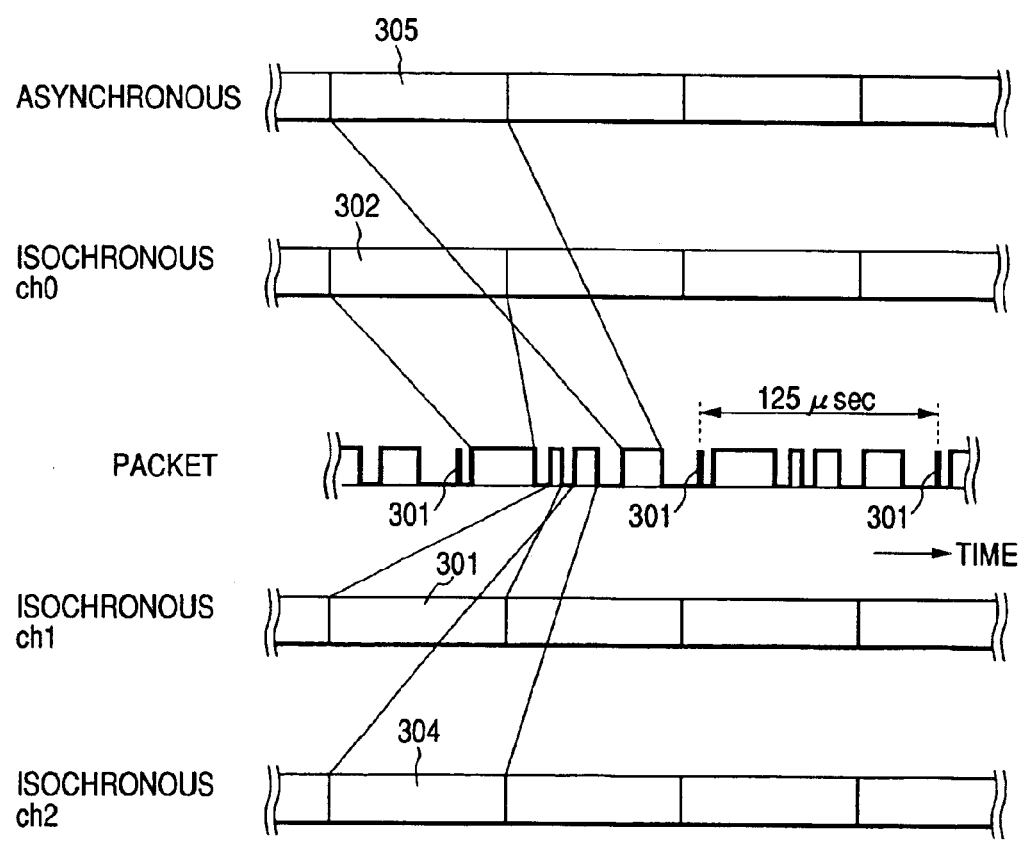
FIG. 3 is a drawing describing the transmission method used with the 1394 interface.

The communication system illustrated in FIG. 3 provides two data transmission methods, the isochronous transmission mode and the asynchronous transmission mode. Because the isochronous transmission mode assures dispatch and reception of a packet containing a given quantity of data within the transmission cycle for one packet (125 $\mu$s), this mode is effective for real-time transmission of video data and audio data. The asynchronous transmission mode sends and receives control commands, file data, and other data in an asynchronous manner, as necessary, and the priority order specified for this mode is lower than that of the isochronous transmission mode.

In FIG. 3, at the beginning of each communication cycle, a communication packet called a cycle start packet 301 is dispatched, which adjusts the cycle times for the timings of the various nodes.

After the cycle start packet 301 has been dispatched, the isochronous transmission mode is specified for a given period of time. In the isochronous transmission mode, multiple isochronous transmissions can be carried out by assigning channel numbers to the respective data items being transmitted based on the isochronous transmission mode.

For instance, in FIG. 3, if a channel number of "ch 0" is assigned to the data 302 being dispatched via isochronous transmission from the DVCR 104, while a channel number of "ch 1" is assigned to the data 303 being dispatched via isochronous transmission from the DVTR 102, and a channel number of "ch 2" is assigned to the data 304 being dispatched via isochronous transmission from the TV101, the various data items are transmitted using isochronous transmission, within a single communication cycle, at the appropriate timing.

When the various isochronous transmissions have been completed, asynchronous transmission is used until the start cycle packet 301 for the next cycle is transmitted. For instance, in FIG. 3, data 305 is sent from the DVCR 104 to the printer 103, based on asynchronous transmission.

Figure 4:
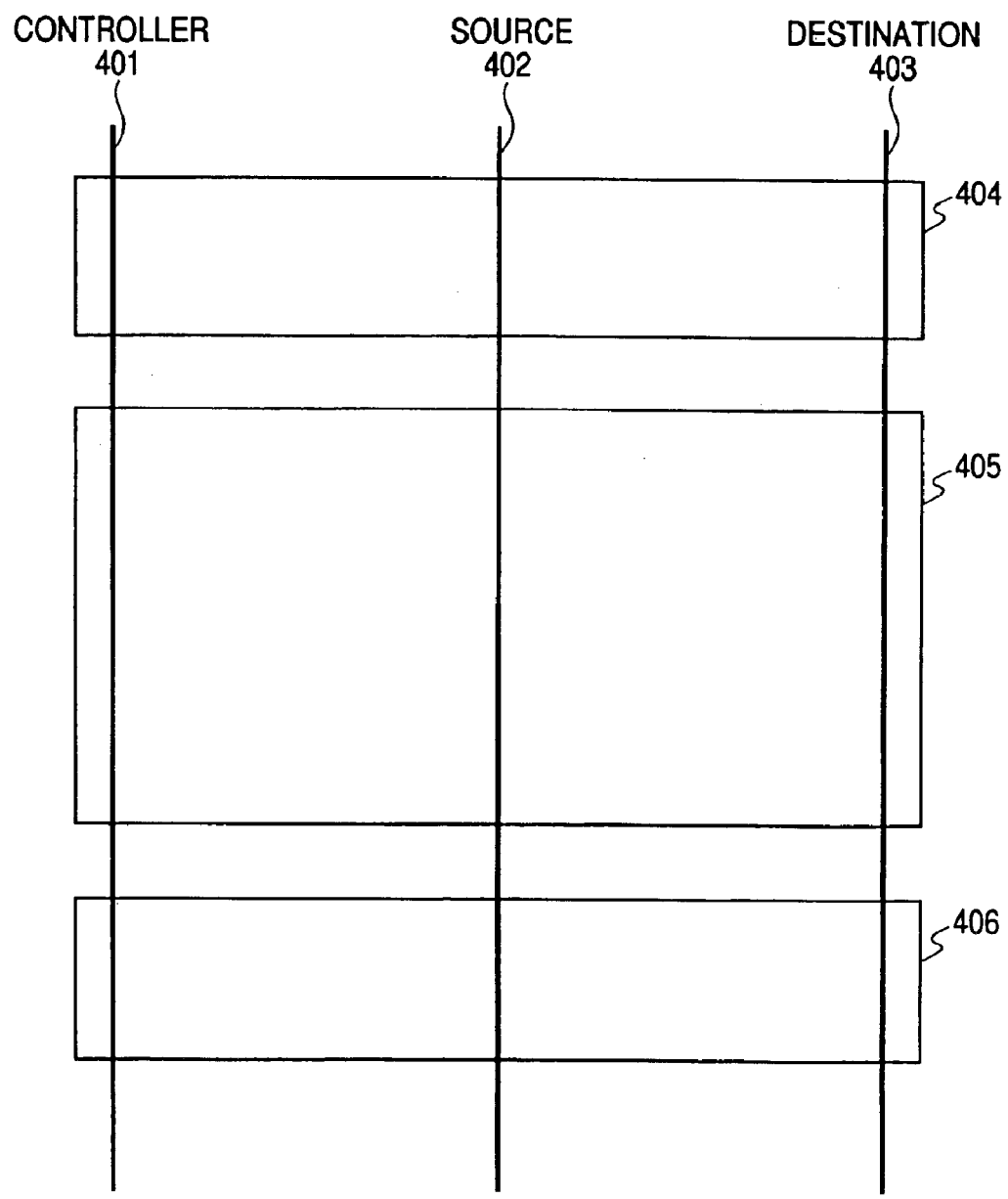
FIG. 4A is a sequence chart describing the basic procedures of the communication protocol of this embodiment.

FIG. 4 shows a sequence chart describing the basic configuration of the communication protocol of this embodiment, using the asynchronous transmission mode. In FIG. 4, the object data (for example, still image data) sequence is sent to the node which handles asynchronous transmission, namely source 402, which is the DVCR 104. Then, the object data sent in sequential order from source 402, using asynchronous transmission, is sent to the reception node, namely the destination 403, which is the printer 103. Following that, the TV 101 is set as the node which controls communications between the source 402 and the destination 403, namely, the controller 401.

The communication protocol for this embodiment consists of three phases. The first phase 404 is the connection phase, when the controller 401 inquires whether or not the destination 403 has a reception buffer large enough to contain the destination offset, which will be described at a later point, and the destination 403 is set in the reception standby state. The controller 401 selects the object data to be sent from the source 402 using asynchronous transmission, and sets the transmission from the transmission buffer.

The second phase 405 is the transmission phase, in which the controller 401 controls the source 402 and the destination 403, and transmits the object data in sequential order, by means of at least one packet, using asynchronous transmission.

The third phase 406 is the connection release phase, in which the controller 401 releases the reception buffer of the destination 403 from its own management, and in the same way, releases the transmission buffer of the source 402 from its management.

FIG. 5 is a drawing which describes the relationship between the object data sent from the source 402 using asynchronous transmission and the reception buffer of the destination 403.

The object data 501 sent from the source 402 using asynchronous transmission is divided into at least one segmented data item 502 which is equivalent to the size of the reception buffer of the destination 403 communicated by the controller 401.

The individual segmented data items 502 are organized into one or more communication packets 503 based on the asynchronous transmission mode (hereafter called asynchronous packets 503), and are sent in sequential order from the source 402 to the destination 403.

The destination 403 receives the asynchronous packets 503 sent in sequential order from the source 402, and writes them temporarily to a reception buffer 504. After transmission of one segment of object data has been completed, the destination 403 writes the individual segments of data stored in the reception buffer 504 to the internal memory 505, in sequential order.

Next, the reception buffer 504, possessed by all of the nodes, including the destination 403, will be described in detail with reference to FIGS. 6A and 6B. The reception buffer 504 is managed by a 64-bit address space conforming to IEEE 1212 CSR (Control and Status Register Architecture) standards (or to ISO/IEC 13213: 1994 standards). IEEE 1212 CSR standards are standards which govern control, management, and address assignments for serial buses.

Figure 6A:
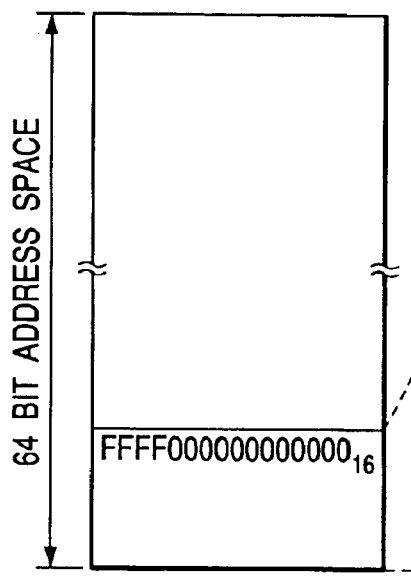
FIGS. 6A and 6B are drawings describing the address spaces of the various nodes.

FIG. 6A shows a logical memory space indicated by a 64-bit address. FIG. 6B shows one part of the address space illustrated by FIG. 6A; for instance, the address space in which the most significant 16 bits will serve as $FFFF_{16}$. The reception buffer 504 uses part of the address space illustrated by FIG. 6B, and is specified by the destination offset indicated by the least significant 48 bits of the address. These destination offsets are specified by the header sections of the various asynchronous packets.

Figure 6B:
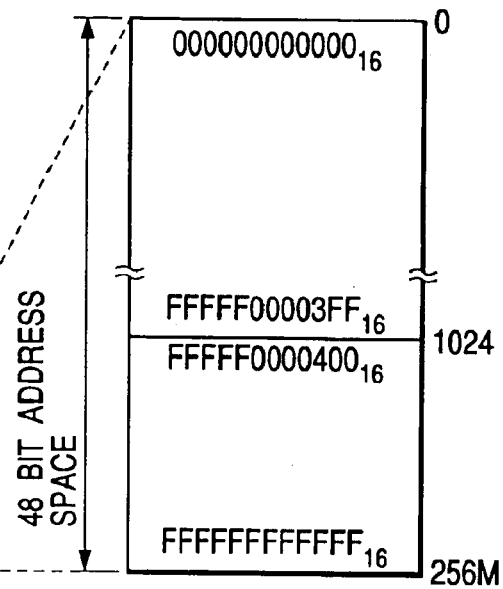

In FIG. 6B, for instance, $000000000000_{16}$ to $0000000003FF_{16}$ are reserved fields, and the fields in which the object data 501 is actually written are the 48 least significant bits of the address, expressed by $FFFFF0000400_{16}$ and subsequent bits.

(First Embodiment)

The communication protocol of the first embodiment is described as it applies to the communication system illustrated by FIG. 1. Here, the TV 101 serves as the controller 401 of the first embodiment, the DVCR 104 as the source 402, and the printer 103 as the destination 403.

In the first embodiment, after the object data (for example, image data, audio data, graphics data, or text data) has been divided into segments consisting of one or more data, as illustrated in FIG. 5, the source 402 sends the segmented data in the form of one or more asynchronous packets, using asynchronous transmission. The destination 403 writes the one or more asynchronous packets sent from the source 402 using asynchronous transmission to the reception buffer 504, and stores the data in the internal memory 505 in units of one segment of data.

The controller 401 selects object data sent from the source 402 in conjunction with the size of the destination 403 buffer, and manages communications with the source 402 involving specifications such as the size of the segmented data formulated by the source 402, and other parameters.

The communication protocol with the configuration of the first embodiment includes, as shown in FIG. 4, three phases, namely a connection phase, a transmission phase, and a connection release phase.

The connection phase and connection release phase of the configuration of the first embodiment can be executed in the same way as the first phase 404 and the third phase 406 shown in FIG. 4. Consequently, with regard to the configuration of the first embodiment, the transmission phase is described in detail.

Figure 7:
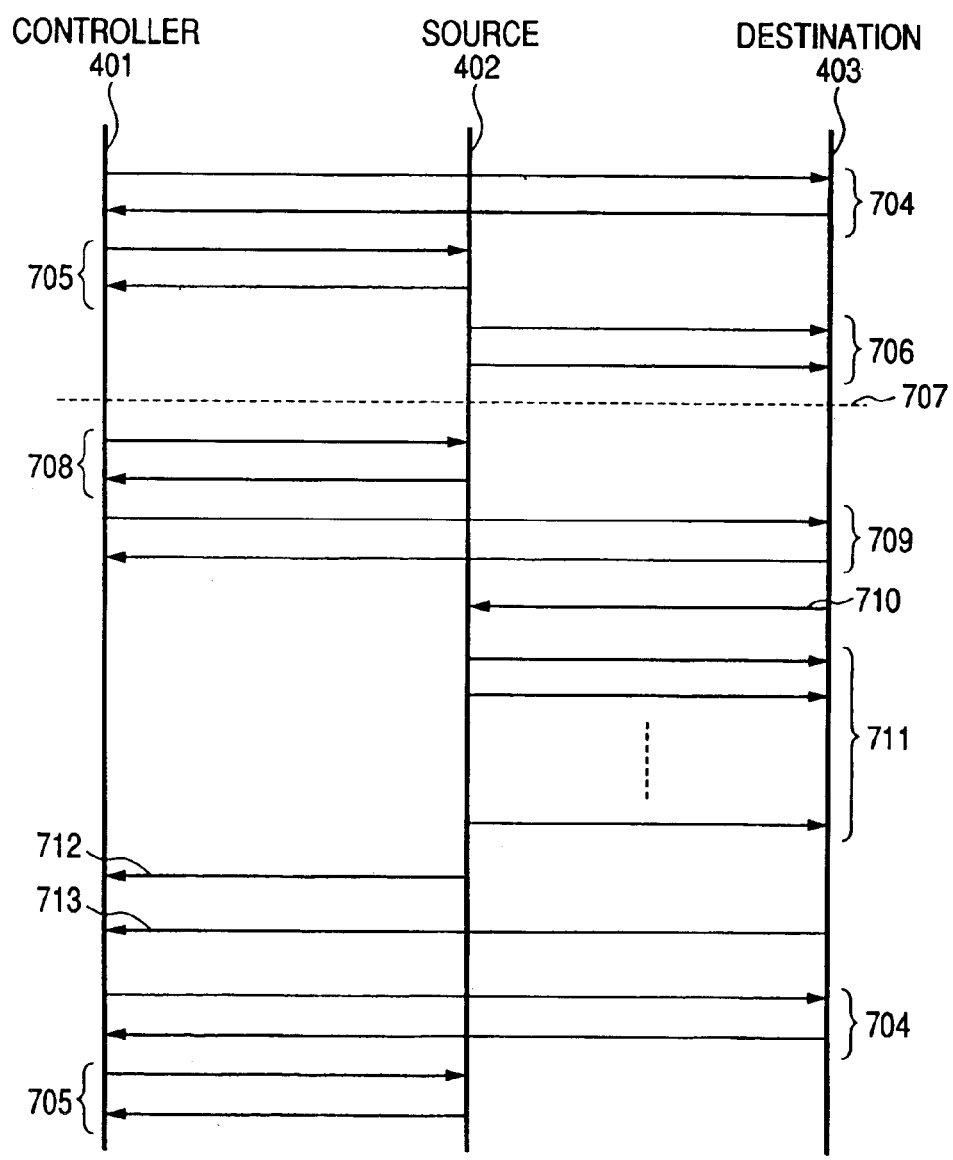
FIG. 7 is a sequence chart describing the communication protocol of the first embodiment.

FIG. 7 is a sequence chart describing the transmission phase of the configuration of the first embodiment in detail.

In FIG. 7, the controller 401 specifies (704) to the destination 403 that the segmented data sent by means of asynchronous transmission is to be received in a number of communication packets. The controller 401 also specifies (705) to the source 402 that the object data is to be divided into one or more segmented data, and that these segmented data are to be transmitted by means of asynchronous transmission in a number of communication packets.

Figure 8:
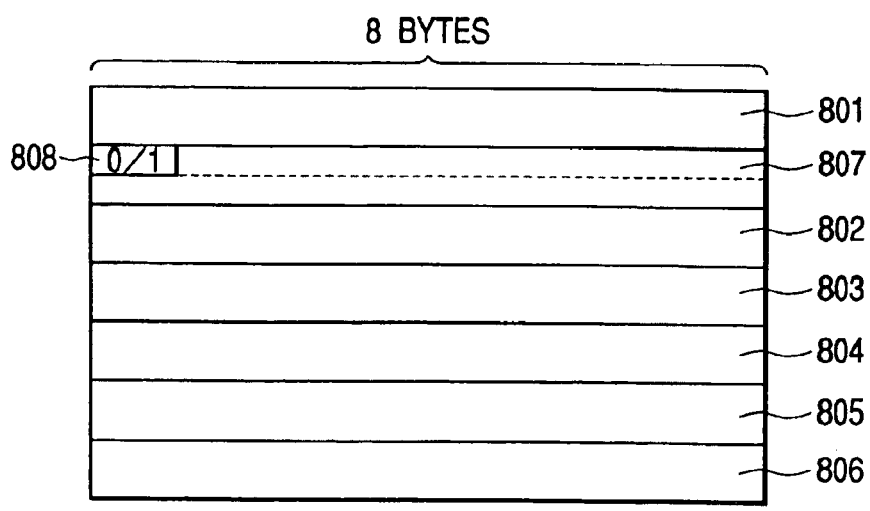
FIG. 8 is a drawing describing the configuration of the communication packets transmitted from the controller to the source.

The configuration of the data section of the communication packet sent from the controller 401 to the source 402 is described here with reference to FIG. 8. The communication packet shown in FIG. 8 is a communication packet which instructs the source 402 to begin transmitting the segmented data, and the data is sent using the asynchronous transmission mode. The communication packet shown in FIG. 8 has a horizontal width of eight bytes.

In FIG. 8, the command which instructs the transmission is stored in the first byte field 801. The segment number indicating the sequential order in which segmented data is to be transmitted is stored in field 802, and the node ID information for the destination 403 is stored in field 803.

The initial address of the reception buffer 504 provided by the destination 403 is stored in field 804. Field 805 contains information pertaining to the size of the reception buffer provided by the destination 403, meaning the size of one data segment. Field 806 contains information pertaining to the maximum size of communication packets that can be received by the destination 403. Field 807 contains various types of status information.

In FIG. 8, an area 808 which contains the re-send identification bit is specified in the area designated for field 807. The source 402 reads this area 808 and determines whether normal transmission processing or re-send processing is to be carried out. For example, if the controller 401 indicates that normal segmented data is to be transmitted from the source 402, this area 808 will contain a "0".

In the configuration of the first embodiment, the source 402 which receives the communication packet shown in FIG. 8 is configured so that the value for the initial address of the reception buffer 504 stored in field 804 is stored in a designated internal register. Here, the internal register is included in the digital interfaces 105 provided by the various devices or the control unit 106 which controls the operations of the various devices (see FIG. 1).

In FIG. 4, following the instruction from the controller 401, the source 402 organizes single data segments into one or more asynchronous packets, and sends these asynchronous packets in sequential order (706) to the destination 403. For instance, as shown in FIG. 5, the source 402 divides single-segment data into n data, and after configuring n asynchronous packets from these data, sends them in sequential order.

Here, the addresses (destination offset) specified by the designated field of the reception buffer 504 provided by the destination 403 are stored in the various asynchronous packets. For instance, the first asynchronous packet of the segmented data contains the initial address of the reception buffer 504, as communicated by the controller 401. Subsequent asynchronous packets contain the offset addresses specifying the designated fields of the reception buffer 504 in sequential order. If a bus reset 707 occurs during asynchronous transmission of single-segment data, the source 402 interrupts the transmission of the segmented data.

The destination 403, along with interrupting the reception of the segmented data, stores the offset address included in the last asynchronous packet to be received normally before the bus reset occurred in the internal register described above. The destination 403 also retains the segmented data stored in the reception buffer 504 without discarding any part of the data.

After bus reset processing has been concluded, the controller 401 which detected the bus reset 707 checks to see whether or not the node IDs of the source 402 and the destination 403 have been changed. Following that, the controller 401 issues instructions to the source 402 and the destination 403 to resume data transmission (708 and 709).

The communication packet carrying the instruction to resume transmission which is sent to the source 402 contains the node ID of the destination 403 which was specified by the bus reset 707. In addition, the data in this communication packet is configured as shown in FIG. 8, and a "1" is stored in area 808 (the re-send identification bit) inside field 807 in that communication packet. The source 402 reads this area 808 and recognizes that re-send processing is to be carried out.

In the same way, the communication packet which instructs the destination 403 that transmission is to be resumed contains the node ID of the source 402 specified by the bus reset 707.

The destination 403, which received the instruction from the controller 401, notifies the source 402 of the offset address stored in the internal register, and also waits (710) for the segmented data to be re-sent from the source 402.

The source 402, which received the instruction from the controller 401, waits for notification from the destination 403 of the offset address. Following notification of the offset address, the source resumes asynchronous transmission of the segmented data from partway through the data (711).

At this point, the source 402 compares the value of the initial address of the reception buffer 504 provided by the destination 403 with the value of the offset address communicated by that destination 403, and identifies the portion of the segmented data from which transmission is to resume, based on the difference between the two values.

Figure 9:
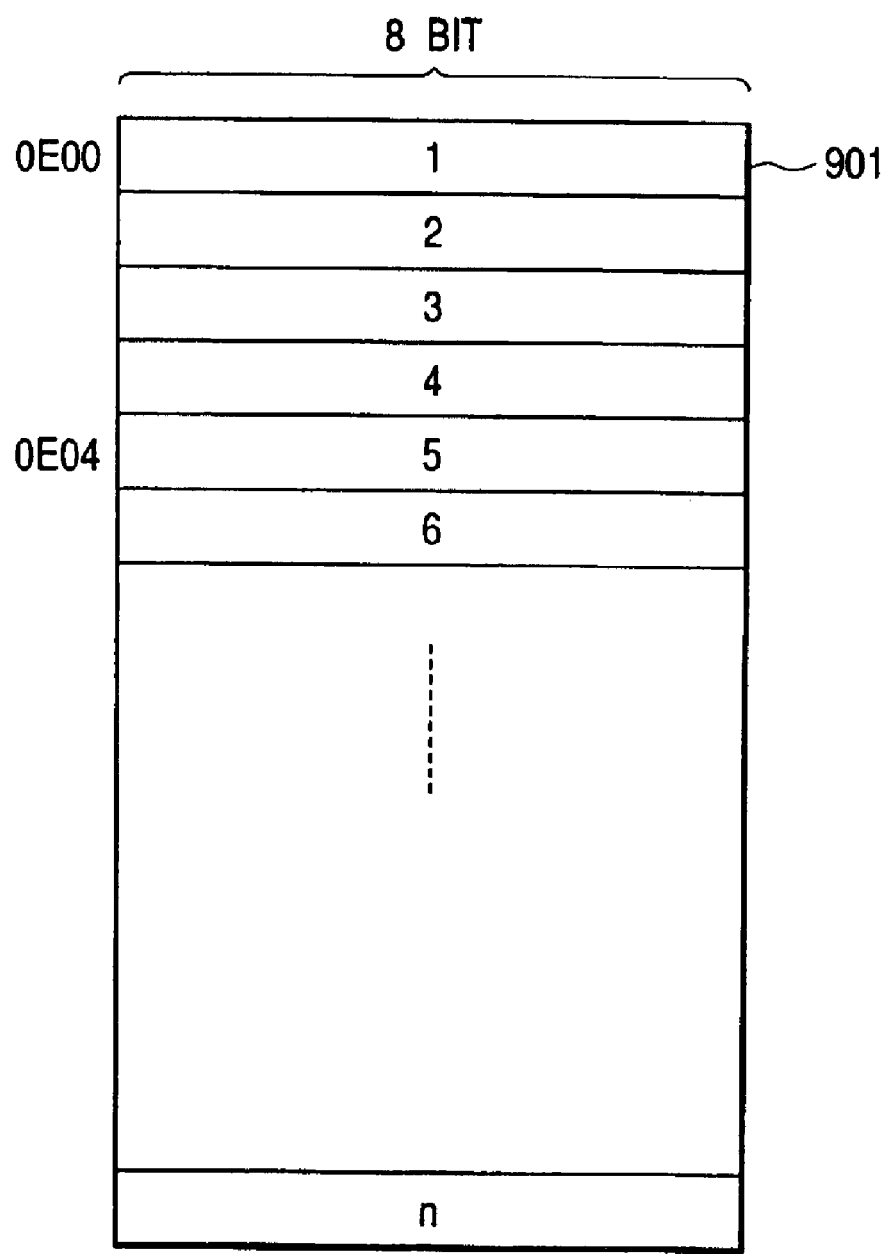
FIG. 9 is a drawing describing the internal addresses provided by the source.

For example, if the least significant 16th bit of the initial address of the reception buffer 504 stored in the internal register is "0E00h", and the least significant 16th bit of the offset address described above is "0E04h", as shown in FIG. 9, the source 402 will resume asynchronous transmission from the data 901 of the fifth byte of the segmented data being transmitted when the transmission was interrupted by the bus reset.

After asynchronous transmission of this single-segment data has been completed, the source 402 reports (712) to the controller 401 that the transmission has been completed. In the same way, the destination 403 reports (713) to the controller 401 that reception of a single-segment data has been completed.

In this way, even if a bus reset occurs during transmission of a single-segment data, executing the procedure indicated by 704 to 713 in FIG. 7 enables transmission of that entire segment of data to be resumed, without having to begin again from the beginning. Also, to begin transmission from the next or subsequent data segments, the controller 401, source 402, and destination 403 need only repeat the procedures indicated by 704 to 713.

As described above, in the configuration of the first embodiment, after the controller 401 detects a bus reset, the source 402 and destination 403 are requested to resume transmission. The source 402, using the offset address communicated by the destination 403 which received the request for resumed transmission, is configured in such a way that it selects the data segments which need to be sent, and sends the data in sequential order, using asynchronous transmission.

Through this procedure, even if a bus reset occurs while segmented data is being transmitted, the time required to restart the transmission and the volume of data caused by redundant transmission can be reduced, at the same time avoiding a deterioration in the transmission efficiency.

(Configuration of the Second Embodiment)

In the following section, the communication protocol of the configuration of the second embodiment will be described, applying the communication system shown in FIG. 1, in the same way as for the configuration of the first embodiment. In this description, for the configuration of the second embodiment, the controller 401 is the TV 101, the source 402 is the DVCR 104, and the destination 403 is the printer 103.

Subsequently, in the configuration of the second embodiment, descriptions of those materials or functions which are identical to or equivalent to those of the configuration of the first embodiment will be omitted, using the same symbols as those used in the configuration of the first embodiment.

The communication protocol of the configuration of the second embodiment, like that of the first embodiment, comprises, as shown in FIG. 4, three phases, namely, a connection phase 404, a transmission phase 405 and a connection release phase 406. Subsequently, in the configuration of the second embodiment, the transmission phase will be described in detail, in the same way as that of the first embodiment.

Figure 10:
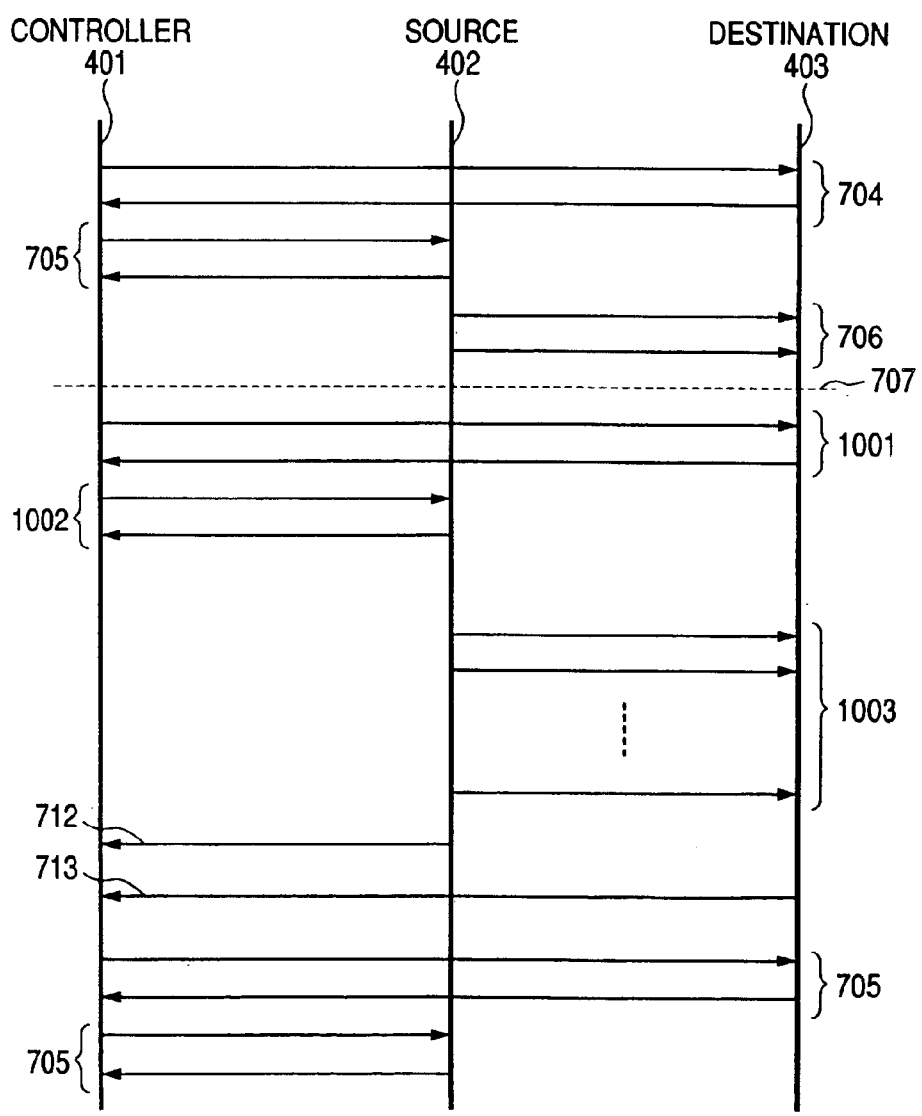
FIG. 10 is a sequence chart describing the communication protocol of the second embodiment.

FIG. 10 is a sequence chart describing the transmission phase of the configuration of the second embodiment in detail.

In FIG. 10, because the procedure up to the point where a bus reset 707 occurs, meaning the procedure consisting of steps 704 to 706 in FIG. 7, is the same as that for the configuration of the first embodiment, a description of that procedure is omitted. The following section describes the processing which takes place following occurrence of a bus reset 707.

If a bus reset 707 occurs during asynchronous transmission of single-segment data, the source 402 interrupts the transmission of the segmented data. Along with interrupting the transmission of the segmented data, the source 402 stores the offset address which is included in the last asynchronous packet to be received normally before the bus reset occurred in an internal register.

The internal register in which the offset address is stored is included in the digital interfaces 105 provided by the various devices or the control unit 106 that controls the operations of the various devices. The offset address described above is stored in an internal register which is different from that in which the initial address of the reception buffer is stored.

The destination 403, along with interrupting reception of the segmented data, retains the segmented data stored in the reception buffer without discarding any part of the data.

After bus reset processing has been concluded, the controller 401 which detected the bus reset 707 checks to see whether or not the node Ibs of the source 402 and the destination 403 have been changed. Following that, the controller 401 issues instructions to the source 402 and the destination 403 to resume data transmission (1001 and 1002).

The communication packet carrying the instruction to resume transmission which is sent to the source 402 contains the node ID of the destination 403 which was specified by the bus reset 707. In addition, the data in this communication packet is configured as shown in FIG. 8, and a "1" is stored in area 808 (the re-send identification bit) inside field 807 in that communication packet. The source 402 reads this area 808 and recognizes that re-send processing is to be carried out.

In the same way, the communication packet which instructs the destination 403 that transmission is to be resumed contains the node ID of the source 402 specified by the bus reset 707.

The destination 403, which received the instruction from the controller 401, waits for the segmented data to be re-sent from the source 402. The source 402, which received the instruction from the controller 401, reads the offset address stored in the internal register described above, and resumes asynchronous transmission starting from the data corresponding to that address (1003).

At this point, the source 402 compares the value of the initial address of the reception buffer 504 provided by the destination 403 with the value of the offset address stored in the internal register described above, and identifies the portion of the segmented data from which transmission is to resume, based on the difference between the two values.

For example, if the least significant 16th bit of the initial address of the reception buffer stored in the internal register is "0E00h", and the least significant 16th bit of the offset address described above is "0E04h", as shown in FIG. 9, the source 402 will resume asynchronous transmission from the data 901 of the fifth byte of the segmented data being transmitted when the transmission was interrupted by the bus reset.

After asynchronous transmission of this single-segment data has been completed, the source 402 reports (712) to the controller 401 that the transmission has been completed. In the same way, the destination 403 reports (713) to the controller 401 that reception of a single-segment data has been completed.

In this way, even if a bus reset occurs during transmission of a single-segment data, executing the procedure indicated in FIG. 10 enables transmission of that entire segment of data to be resumed, without having to begin again from the beginning.

Also, to begin transmission from the next or subsequent data segments, the controller 401, source 402, and destination 403 need only repeat the procedure indicated in FIG. 10.

As described above, in the configuration of the second embodiment, after the controller 401 detects a bus reset, the source 402 and destination 403 are requested to resume transmission. The source 402 is configured in such a way that it uses the offset address included in the asynchronous packet transmitted normally prior to the bus reset, selects the portion of the segmented data which needs to be sent, and sends the data in sequential order using asynchronous transmission.

Through this procedure, even if a bus reset occurs while segmented data is being transmitted, in the same way as the configuration of the first embodiment, the time required to restart the transmission and the volume of data caused by redundant transmission can be reduced, at the same time avoiding a deterioration in the transmission efficiency.

(Configuration of the Third Embodiment)

In the following section, the communication protocol of the configuration of the third embodiment will be described, applying the communication system shown in FIG. 1. In this description, for the configuration of the third embodiment, the controller 401 is the TV 101, the source 402 is the DVCR 104, and the destination 403 is the printer 103.

Subsequently, in the configuration of the third embodiment, descriptions of those materials or functions which are identical to or equivalent to those of the configuration of the first embodiment will be omitted, using the same symbols as those used in the configuration of the first embodiment.

In the configuration of the third embodiment, after the information data has been divided into one or more data segments, the source 402 transmits those data segments as one or more asynchronous packets, using asynchronous transmission.

The destination 403 receives the one or more asynchronous packets sent from the source 402 using asynchronous transmission, and stores the data in an internal memory, in single data segments. The controller 401 selects information data sent from the source 402 in conjunction with the size of the destination 403 buffer, and manages communications with the source 402 involving specifications such as the size of the segmented data formulated by the source 402, and other parameters.

The communication protocol of the configuration of the third embodiment, like that of the first embodiment, comprises three phases, namely, a connection phase 404, a transmission phase 405 and a connection release phase 406. Subsequently, in the configuration of the third embodiment, the transmission phase will be described in detail.

Figure 11:
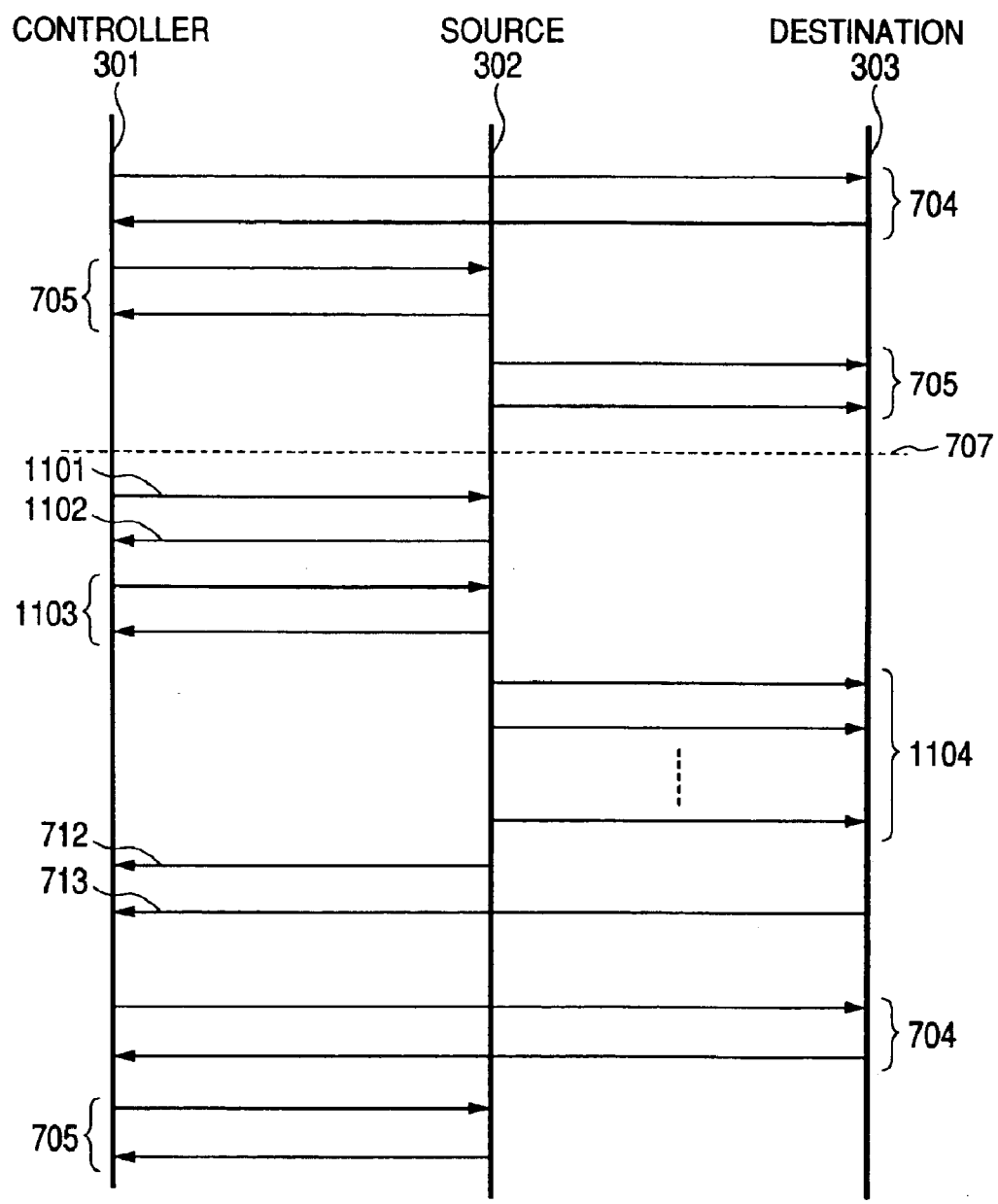
FIG. 11 is a sequence chart describing the communication protocol of the third embodiment.
Figure 12:
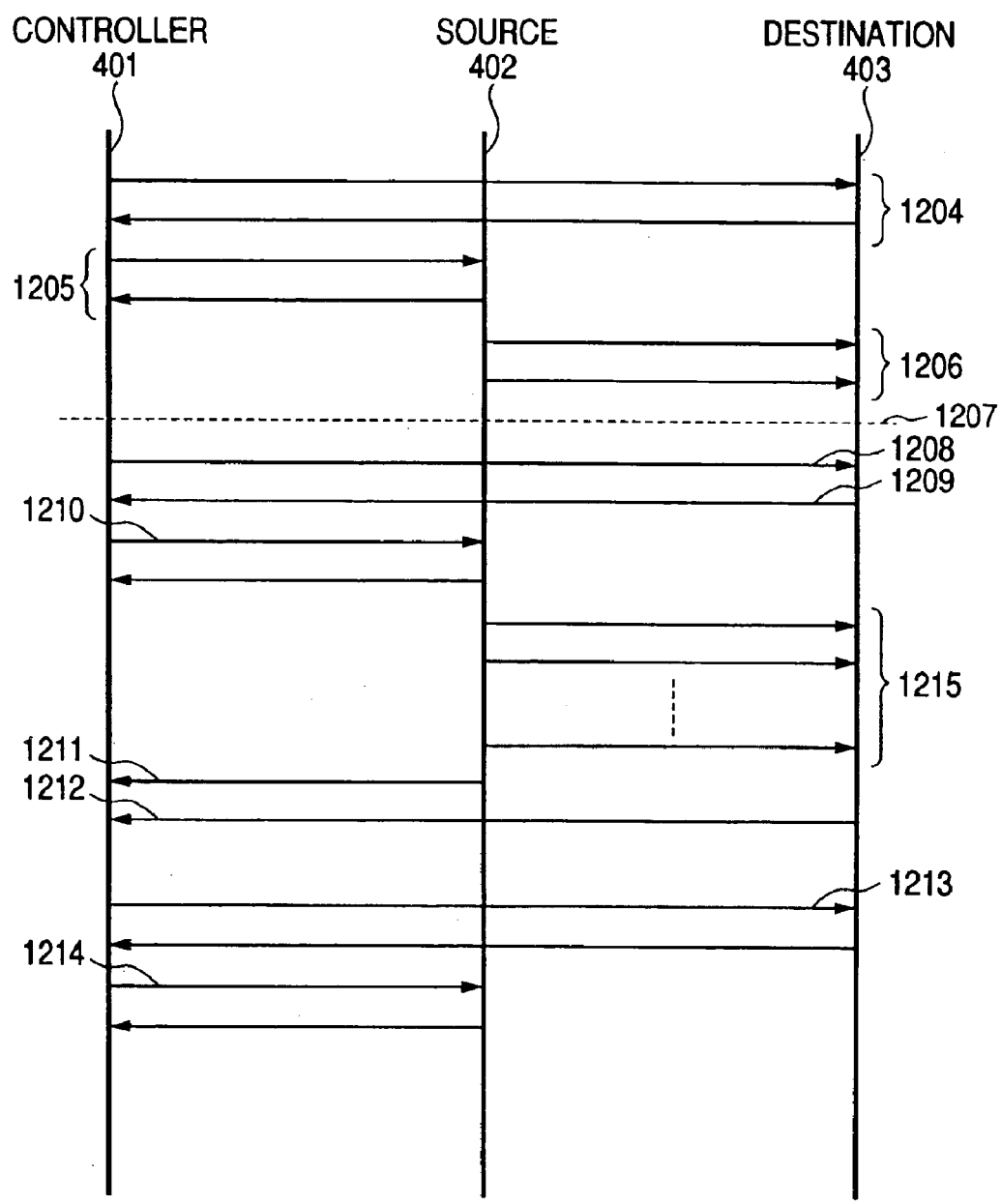
FIG. 12 is a sequence chart describing the communication protocol of the fourth embodiment.

FIG. 11 is a sequence chart describing the transmission phase of the configuration of the third embodiment in detail.

In FIG. 11, because the procedure up to the point where a bus reset 707 occurs, meaning the procedure consisting of steps 1104 to 1106 in FIG. 11, is the same as that for the configuration of the first embodiment, a description of that procedure is omitted. The following section describes the processing which takes place following occurrence of a bus reset 707.

If a bus reset 707 occurs during asynchronous transmission of single-segment data, the source 402 interrupts the transmission of the segmented data. Along with interrupting the transmission of the segmented data, the source 402 stores the offset address which is included in the last asynchronous packet to be received normally before the bus reset occurred in an internal register.

The internal register in which the offset address is stored is included in the digital interfaces 105 provided by the various devices or the control unit 106 that controls the operations of the various devices. The offset address described above is stored in an internal register which is different from that in which the initial address of the reception buffer is stored.

The destination 403, in addition to interrupting reception of the segmented data, also retains the segmented data stored in the reception buffer without discarding any part of the data.

After bus reset processing has been concluded, the controller 401 which detected the bus reset 707 checks to see whether or not the node IDs of the source 402 and the destination 403 have been changed. Following that, the controller 401 requests from the source 402 the offset address containing the last asynchronous packet to have been transmitted normally (1101).

The data in the communication packet sent to the source 402 is configured as shown in FIG. 8, and a "1" is stored in area 808 (the re-send identification bit) inside field 807 in that communication packet. The source 402 reads this area BOB and recognizes that re-send processing is to be carried out.

In response to this request, the source 402 reads the offset address stored in the internal register described above, and communicates the address to the controller 401 (1102). The controller 401, after receiving the notification from the source 402, issues an instruction (1103) to resume asynchronous transmission starting from the data corresponding to that offset address.

The source 402, which received the instruction from the controller 401 to resume transmission, resumes asynchronous transmission starting from the data corresponding to the offset address described above (1104).

At this point, the source 402 compares the value of the initial address of the reception buffer 504 provided by the destination 403 with the value of the offset address described above, and identifies the portion of the segmented data from which transmission is to resume, based on the difference between the two values.

For example, if the least significant 16th bit of the initial address of the reception buffer 504 stored in the internal register is "0E00h", and the least significant 16th bit of the offset address described above is "0E04h", as shown in FIG. 9, the source 402 will resume asynchronous transmission from the data 901 of the fifth byte of the segmented data being transmitted when the transmission was interrupted by the bus reset.

After asynchronous transmission of this single-segment data has been completed, the source 402 reports (712) to the controller 401 that the transmission has been completed. In the same way, the destination 403 reports (713) to the controller 401 that reception of a single-segment data has been completed.

In this way, even if a bus reset occurs during transmission of a single-segment data, executing the procedure indicated in FIG. 11 enables transmission of that entire segment of data to be resumed, without having to begin again from the beginning.

Also, to begin transmission from the next or subsequent data segments, the controller 401, source 402, and destination 403 need only repeat the procedure indicated in FIG. 11.

As described above, in the configuration of the third embodiment, after the controller 401 detects a bus reset, it asks the source 402 for the offset address included in the asynchronous packet transmitted normally prior to the bus reset. The controller 401 is configured so that it then instructs the source 402 to resume asynchronous transmission starting from the data segment corresponding to the offset address communicated from the source 402.

Through this procedure, even if a bus reset occurs while segmented data is being transmitted, in the same way as the configuration of the first embodiment, the time required to restart the transmission and the volume of data caused by redundant transmission can be reduced, at the same time avoiding a deterioration in the transmission efficiency.

[Configuration of the Embodiment of the Invention]
(Fourth Embodiment)

The following section describes the configuration of the fourth embodiment, based on the drawings.

The flow of the data transmission phase 405 of the present invention is shown in FIG. 13. The connection phase 404 and the connection release phase 406 are the same as those shown in FIG. 4.

In FIG. 13, the controller 401 first issues an instruction (1004) to the destination 403 to receive the segmented data, and instructs the source 402 to send the segmented data (1205). The field 804 of the command packet issued here by the controller 401 serves as the initial address of the buffer 504 of the destination 403. Also, the re-send identification bit 808 in the status field 807 is set to "0", which indicates that the command is an ordinary segment transmission command.

The source 402 stores the value for the initial address 804 of the buffer 504 of the destination 403 in an internal register. The various segments of data are sent (1206) from the source 402 to the destination 403 as a number of asynchronous packets.

Assuming a bus reset (1207) occurring at this point, the source 402 interrupts the data transmission. The destination 403, along with interrupting the reception of the data, stores the offset address which is included in the last asynchronous packet to be received normally before the bus reset occurred in an internal register. The data in the destination 403 buffer 504 is retained, without any part of the data being discarded.

Following this, the controller 401 which detected the bus reset requests from the destination 403 the offset address of the last asynchronous packet to have been received normally (1208). The destination 403 notifies (1209) the controller 401 of the offset address stored in the internal register.

The controller 401 notifies the source 402 of the offset address communicated from the destination 403, and also instructs that transmission is to be resumed (1210). At this time, the value of the re-send identification bit 808 in the status field 807 of the command sent from the controller 401 is "1", indicating that the command is an instruction to send the segment transmission once again. The field 804 also serves as the offset address of the buffer which was communicated from the destination 403.

The source 402 selects the data in the segment from which the re-transmission is to begin. This is done by identifying the difference between the initial address of the reception buffer 504 of the destination 403, which was stored in an internal register when the first re-send command was received, and the value in the re-send command field 804.

For example, if the least significant 16th bit of the initial address of the reception buffer of the destination 403 stored in the internal register when the first re-send command was received is "0E00h", and the least significant 16th bit of the offset address in the re-send command field 808 is "0E04h", as shown in FIG. 8, the source 402 will resume asynchronous transmission from the data 901 of the fifth byte of the segmented data being transmitted when the transmission was interrupted by the bus reset (1215).

After asynchronous transmission of this segmented data has been completed, normally the source 402 reports (1211) to the controller 401 that the transmission has been completed. The destination 403 also reports (1212) to the controller 401 that reception of the segmented data has been completed.

When the transmission of the segmented data which was interrupted has been completed, the controller 401 instructs the destination 403 once again to receive the next segmented data (1213), and instructs the source 402 to send the next segmented data (1214). At this point, the command field 804 serves as the initial address of the buffer for the destination 403, and the value of the re-send identification bit 808 in the status field 807 is set to "0", which indicates that the command is an ordinary segment transmission command.

By configuring the data communication system of the present embodiment in this manner, segments can be transmitted without starting over from the beginning even if a bus reset occurs, and unnecessary re-transmission of data can be eliminated. In addition, there is no need to reduce the size of the destination buffer, so that communication is kept to the segmented data itself, suppressing increases in the volume of bus traffic and improving transmission efficiency.

(Configuration of the Fifth Embodiment)

The configurations of the embodiments 1 to 4 described above can be actualized by means of software. For example, these embodiments are configured in such a way that a storage medium on which software program codes which actualize the functions of the embodiment configurations described above have been stored can be supplied to control units (including microcomputers) provided by the controller 401, source 402, and destination 403 of the present embodiment configurations.

The embodiment configurations of the present invention can be actualized by the control units provided by the controller 401, source 402, and destination 403 of the present embodiment configurations reading the program codes stored on the storage medium, and controlling the operations of the system or the device so as to achieve the functions of the embodiment configurations described above.

For example, a storage medium containing program codes which actualize the processing and functions of the various embodiments shown in FIGS. 7, 10, 11, and 12 is supplied to the control units 106 of the nodes which serve as the controller 401, source 402 and destination 403.

The control units 106 of the nodes which serve as the controller 401, source 402 and destination 403 may then read the program codes stored on the storage medium, and operate so as to actualize the functions of the various embodiment configurations.

In this case, the program codes read from the storage medium actualize the functions of the embodiment configurations described above themselves, which makes the storage medium on which those program codes have been stored a configuration element of the present invention.

As a storage medium from which the program codes are supplied, various media may be used, such as, for example, a floppy disk, hard disk, optical disk, opto-magnetic disk, CD-ROM, CD-R, magnetic tape, non-volatile memory card, or ROM.

In addition, a medium such as an OS (operating system) or application software running in the control unit, based on the instructions of the program codes read from the storage medium, might be included in the present invention to actualize the functions of the embodiment configurations described above, by controlling the operations of the system or devices of the configuration of the present embodiment.

Furthermore, after the program codes read from the storage medium have been written to a function expansion board connected to a control unit or a memory provided by a function expansion unit, the control unit provided by said function expansion board may be said to be included in the present invention if the functions of the embodiment configurations described above are actualized by controlling the operation of the system or devices of the present embodiment configuration.

Execution may be carried out in various manners without straying from the spirit or the primary features of the present invention.

For example, in the configurations of the first to fourth embodiments, the functions of the controller 401, the source 402 and the destination 403 were described assuming that those various devices were provided, but the present invention is not necessarily limited to those circumstances. For instance, the configuration might be designed to include devices which provide the same functions as those of the controller 401 and the source 402 indicated in the configurations of the first to fourth embodiments.

If the present invention is configured in this way, because communication between the controller 401 and the source 402 is carried out without a transmission channel being shared by the various devices, it may be possible to increase the transmission efficiency of the overall communication system.

Consequently, the embodiment configurations described above are no more than examples of a number of points, and should not be interpreted in a limiting manner.

What is claimed is:

1. A communication system comprising:

a destination that includes a receiving buffer; and a source adapted to transmit one segment of data to the destination using address information corresponding to a part of the receiving buffer of the destination, wherein the source is adapted to interrupt transmission of the data if a process of resetting a bus between the source and the destination occurs, and to resume, after the process of resetting the bus ends, the transmission of the data without retransmitting data determined by the source to be already stored in the receiving buffer.

2. A communication method for a communication apparatus that transmits one segment of data to a destination using address information corresponding to a part of a receiving buffer of the destination, the method comprising the steps of:

interrupting transmission of the data if a process of resetting a bus between the apparatus and the destination occurs; and resuming, after the process of resetting the bus ends, the transmission of the data without retransmitting data determined by the apparatus to be already stored in the receiving buffer.

3. A communication apparatus that transmits one segment of data to a destination using address information corresponding to a part of a receiving buffer of the destination, the apparatus comprising:

interrupting means for interrupting transmission of the data if a process of resetting a bus between the apparatus and the destination occurs; and resuming means for resuming, after the process of resetting the bus ends, the transmission of the data without retransmitting data determined by the apparatus to be already stored in the receiving buffer.

4. The communication system according to claim 1, wherein the source is adapted to resume the transmission of the data using address information sent from the destination.

5. The communication system according to claim 1, wherein the source is adapted to resume the transmission of the data using address information managed by the apparatus.

6. The communication system according to claim 1, wherein the bus conforms to an IEEE 1394-1995 standard.

7. The method according to claim 2, wherein the resuming step is adapted to resume the transmission of the data using address information sent from the destination.

8. The method according to claim 2, wherein the resuming step is adapted to resume the transmission of the data using address information managed by the apparatus.

9. The method according to claim 2, wherein the bus conforms to an IEEE 1394-1995 standard.

10. The communication apparatus according to claim 3, wherein the resuming means is adapted to resume the transmission of the data using address information sent from the destination.

11. The communication apparatus according to claim 3, wherein the resuming means is adapted to resume the transmission of the data using address information managed by the apparatus.

12. The communication apparatus according to claim 3, wherein the bus conforms to an IEEE 1394-1995 standard.

13. A communication apparatus that transmits one segment of data to a destination using address information corresponding to a part of a receiving buffer of the destination, the apparatus comprising:

a digital interface connected to a bus between the apparatus and the destination; and a controller adapted to control communication between the apparatus and the destination, wherein the controller is adapted to interrupt transmission of the data if a process of resetting a bus between the apparatus and the destination occurs, and to resume, after the process of resetting the bus ends, the transmission of the data without retransmitting data determined by the apparatus to be already stored in the receiving buffer.

14. The communication apparatus according to claim 13, wherein the controller is adapted to resume the transmission of the data using address information sent from the destination.

15. The communication apparatus according to claim 13, wherein the controller is adapted to resume the transmission of the data using address information managed by the apparatus.

16. The communication apparatus according to claim 13, wherein the bus conforms to an IEEE 1394-1995 standard.

* * * * *

UNITED STATES PATENT AND TRADEMARK OFFICE
CERTIFICATE OF CORRECTION

PATENT NO. : 6,895,003 B1
DATED : May 17, 2005
INVENTOR(S) : Takashi Kobayashi et al.

It is certified that error appears in the above-identified patent and that said Letters Patent is hereby corrected as shown below:

Column 1,
Line 13, "is" should be deleted.

Column 11,
Line 48, "Ibs" should read -- IDs --.

Signed and Sealed this

Sixth Day of September, 2005

JON W. DUDAS
*Director of the United States Patent and Trademark Office*